(12) United States Patent
Kubota et al.

(10) Patent No.: US 8,121,411 B2
(45) Date of Patent: Feb. 21, 2012

(54) LINEAR TRANSFORMATION MATRIX CALCULATING APPARATUS, METHOD THEREOF AND PROGRAM THEREOF

(75) Inventors: Susumu Kubota, Tokyo (JP); Tomokazu Kawahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 12/558,817

(22) Filed: Sep. 14, 2009

(65) Prior Publication Data
US 2010/0195917 A1    Aug. 5, 2010

(30) Foreign Application Priority Data
Feb. 4, 2009  (JP) .................................. 2009-023805

(51) Int. Cl.
*G06K 9/00* (2006.01)
*G06F 15/00* (2006.01)
*H04N 7/16* (2011.01)

(52) U.S. Cl. ........................ 382/181; 704/200; 725/19
(58) Field of Classification Search .................. 382/159, 382/165, 169, 170, 181, 218, 224, 248, 276, 382/277; 704/200, 203, 219, 235, 260, 262, 704/269; 708/254, 274, 514, 520; 725/19
See application file for complete search history.

(56) References Cited

U.S. PATENT DOCUMENTS

| | | | | |
|---|---|---|---|---|
| 6,754,628 B1 * | 6/2004 | Chaudhari et al. | ............ | 704/246 |
| 7,010,167 B1 * | 3/2006 | Ordowski et al. | ............ | 382/225 |

FOREIGN PATENT DOCUMENTS

| | | |
|---|---|---|
| JP | 2003248826 | 9/2003 |
| JP | 2006221479 | 8/2006 |

* cited by examiner

*Primary Examiner* — Abolfazl Tabatabai
(74) *Attorney, Agent, or Firm* — Turocy & Watson, LLP

(57) ABSTRACT

A linear transformation matrix calculating apparatus linearly transforms a plurality of dictionary subspaces which belong to respective categories by a linear transformation matrix respectively, selects a plurality of sets of two dictionary subspaces from the plurality of linearly transformed dictionary subspaces, calculates a loss function using similarities among the selected sets of dictionary subspaces respectively, calculates a differential parameter obtained by differentiating the loss function by the linear transformation matrix, calculates a new linear transformation matrix from the differential parameter and the linear transformation matrix by Deepest Descent Method, and updates the new linear transformation matrix as the linear transformation matrix used in the linear transformation unit.

9 Claims, 5 Drawing Sheets

LINEAR TRANSFORMATION MATRIX CALCULATING APPARATUS, METHOD THEREOF AND PROGRAM THEREOF

CROSS-REFERENCE TO RELATED APPLICATION

This application is based upon and claims the benefit of priority from the prior Japanese Patent Application No. 2009-23805, filed on Feb. 4, 2009; the entire contents of which are incorporated herein by reference.

FIELD OF THE INVENTION

The present invention relates to a technology of recognition of patterns such as images or speeches.

DESCRIPTION OF THE BACKGROUND

According to improvement of a processing performance of computers and a proliferation of inexpensive cameras, a method of recognition by inputting a plurality of images retrieved from a video sequence, obtaining a pattern distribution of the input images and a pattern distribution of dictionary images, and comparing a similarity between the distributions is now in a practical stage in the field of the pattern recognition such as face recognition.

As one of methods of measuring a similarity between the distributions described above, Mutual Subspace Method is proposed in JP-A-2003-248826 (KOKAI). The Mutual Subspace Method recognizes a category of input patterns by approximating input patterns and dictionary patterns in subspaces respectively and measuring the similarity between the subspaces by a canonical angle.

A subspace method in the related art is configured to measure the similarity between one input pattern vector and a subspace which indicates a focused category. In contrast, the Mutual Subspace Method described above is configured to convert an input image sequence into a subspace as well when a plurality of images are input from a target of recognition such as the moving image and measure the similarity among the subspaces. At this time, a square of a cosine of an angle referred to as a canonical angle formed between the two subspaces to be compared is used as the "similarity".

Bases of two subspaces Sm and Sn are expressed as $\phi^{(m)} = (\phi_1^{(m)}, \ldots, \phi_K^{(m)})$ and $\phi^{(n)} = (\phi_1^{(n)}, \ldots, \phi_L^{(n)})$ respectively, and it is assumed to be $K \leq L$. The canonical angles are defined by a smaller number of dimensions between the two subspaces (K, in this case), and when ordering the canonical angles in ascending number order as; $\{\theta_1^{(nm)}, \ldots, \theta_K^{(nm)}\}$, an $i^{th}$ eigenvalue of an eigenvalue problem indicated by an expression (1) shown below is given to a $\cos\theta_i^{(nm)}$.

$$\Phi^{(n)T}\Phi^{(m)}\Phi^{(m)T}\Phi^{(n)}\alpha = \lambda\alpha \qquad (1)$$

The eigenvalue problem is introduced as shown below using Lagrange Multiplier Method.

A given unit vector on the subspace Sn is expressed by $\Phi^{(n)}$ a by a linear combination of $\phi^{(n)}_i$ using an $L^{th}$ dimensional unit vector a ($a^T a = 1$). A square of a projecting length when it is projected in the subspace Sm is a $^T\Phi^{(n)T}\Phi^{(m)}\Phi^{(m)T}\Phi^{(n)}$a. Then, in order to maximize the above-described value under the restriction of $a^T a = 1$, an expression (2) shown below using a multiplier $\lambda$ is differentiated with respect to a and $\lambda$. Then, the eigenvalue problem of the expression (1) is obtained with respect to a from the differentiation.

$$\alpha^T\Phi^{(n)T}\Phi^{(m)}\Phi^{(m)T}\Phi^{(n)}\alpha - \lambda(\alpha^T\alpha - 1) \qquad (2)$$

In the expression (2), a first canonical angle means an angle formed between a unit vector selected from unit vectors in one of the subspaces which achieves a longest projecting length to the other subspace and a vector of the same projected to the other subspace, and is an angle at which the two subspaces get nearest to each other.

The canonical angle used in the Mutual Subspace Method is an angle formed between the two subspaces, and what is meant thereby is clear in terms of geometrical point of view. However, when it is used as the similarity between the patterns, a small conical angle does not necessarily mean that they are similar patterns. The reason is that a criterion of the similarity depends on the problem, and an adequate similarity measure should be learned depending on the problem.

Under an awareness of the issues as described above, Orthogonal Mutual Subspace Method is proposed in Japanese Patent Application No. 2005-035300. This Orthogonal Mutual Subspace Method is configured to obtain a linear transformation matrix which increases the canonical angle between the subspaces which belong to different categories by solving the eigenvalue problem.

In other words, the Orthogonal Mutual Subspace Method obtains an autocorrelation matrix S of basis vectors $\phi_i^m$ of all of the dictionary subspaces from an expression $S = \Sigma_m \Sigma_i \phi_i^m \phi_i^{mt}/(\Sigma_m \Sigma_i 1)$, and the similarity is obtained by linearly transforming the subspaces by a matrix O obtained by using an expression (3) shown below, $$O = V\Lambda^{-1/2}V^t \qquad (3)$$

where V is a matrix of eigenvectors of S and $\Lambda$ is a diagonal matrix having the eigenvalues of S as diagonal components.

Though the Orthogonal Mutual Subspace method increases the canonical angles between the subspaces witch belong to different categories, it does not necessarily reduce the canonical angles between the subspaces which belong to the same category.

According to an experiment conducted by an inventor, it was found that the Orthogonal Mutual Subspace Method increased not only the canonical angle between the subspaces which belong to the different categories, but also the canonical angle between the subspaces which belong to the same category when being compared with the Mutual Subspace Method in which the linear transformation is not performed. However, since the amount of increase of the canonical angle is larger in the case of the canonical angle between the subspaces which belong to the different categories, a higher performance is expected in comparison with the Mutual Subspace Method. Therefore, the Orthogonal Mutual Subspace Method has a certain advantage over the Mutual Subspace Method from a practical standpoint.

The reason why the result of experiment was as described above will be described below. The Orthogonal Mutual Subspace Method is a method based on a finding such that the canonical angle between the different categories increases when the linear transformation matrix given by the expression (3) is used, and is not a method which is able to operate the canonical angle by itself directly as a target of optimization.

In contrast, in order to improve an accuracy of the pattern recognition, it is more effective to selectively increase the canonical angles of pairs of the subspaces whose canonical angles are small even though they belong to the different categories than to uniformly increase the canonical angle between the subspaces which belong to the different categories since the probability of confusion of the patterns which are easily confused is reduced.

In the same manner, as regards the canonical angle between the subspaces which belong to the same category, it is preferable to selectively reduce the canonical angle of the combination of the subspaces which forms a large canonical angle rather than to reduce the same on an average.

A framework to provide a desirable output value to a combination of the subspaces to be input as a desired output and optimize a parameter so as to minimize a deviation between the teacher signal and an output is generally used in a problem of machine leaning.

However, in the method using the Mutual Subspace Method, it is difficult to perform the learning applying the optimization framework. It is because the basis of the linearly transformed subspace is needed to be converted to an orthonormal basis by Gram-Schmidt orthogonalization, and due to the necessity of this operation when linearly transforming the subspace to obtain the canonical angle, differentiation of the canonical angle with respect to the linear transformation cannot be obtained in a general form.

In view of such problems, it is an object of the invention to provide a linear transformation matrix calculating apparatus in which a linear transformation matrix which decreases similarities among subspaces which belong to different categories, while increasing the similarities between subspaces which belong to the same category is obtained, a method thereof, and a program thereof.

SUMMARY OF THE INVENTION

According to embodiments of the invention, there is provided a linear transformation matrix calculating apparatus provided in a pattern recognizer configured to transform an input pattern into an input subspace, calculate a similarity with a plurality of dictionary subspaces which belong to respective categories defined in advance, and classify the input pattern into one of the categories by a Mutual Subspace Method and configured to obtain a linear transformation matrix used for linearly transforming the input subspace and the dictionary subspaces as a preprocess for calculating the similarity by using the Mutual Subspace Method, including: a linear transformation unit configured to linearly transform the plurality of dictionary subspaces which belong to the respective categories respectively by the linear transformation matrix; a loss function calculating unit configured to select a plurality of combinations of two of the linearly transformed plurality of dictionary subspaces and calculate a loss function using respective similarities of the selected combinations of the dictionary subspaces; a differential calculating unit configured to calculate a differential parameter obtained by differentiation of the loss function with respect to the linear transformation matrix; and an updating unit configured to calculate a new linear transformation matrix using the differential parameter and the linear transformation matrix by Steepest Descent Method and update the new linear transformation matrix as the linear transformation matrix used in the linear transformation unit.

According to the invention, the linear transformation matrix which decreases the similarity among the dictionary subspaces which belong to the different categories, while increasing the similarity between the dictionary subspaces which belong to the same category is obtained.

DETAILED DESCRIPTION OF THE INVENTION

Before describing detailed embodiments of the invention, a theory of the embodiments will be described.

Mutual Subspace Method uses a square of a cosine of a canonical angle as a similarity. However, a smaller angle does not necessarily mean a higher similarity as described above. The reason is that a criterion of similarity depends on the problem, and a distance measure such as the similarity should be learned depending on the problem.

Therefore, an inner product of vectors x and y is defined as $y^T M x$ using a metric matrix M, and a problem of obtaining the metric matrix M by leaning so that a canonical angle in this metric space becomes small between subspaces which belong to the same category and large between the subspaces which belong to the different categories is considered.

When the M is decomposed as $M=TT^T$, obtaining the inner product in the metric space represented by the metric matrix M is equivalent to obtaining a normal inner product after linearly transforming the vectors as an expression (4) shown below.

$$x' = T^T x \quad (4)$$

In the following description, a method of obtaining a linear transformation matrix T by learning will be explained.

First of all, it is assumed that N pieces of subspaces Pi, (where i=1, . . . , N) are provided, and a basis of the each subspace is expressed as $\Phi^{(i)}$. Also, it is assumed that the each respective subspace is assigned with ID $c_i$ of the category to which it belongs as a desired output.

The subspaces $P_i$, $P_j$ are linearly transformed by the linear transformation matrix T, and a square of a cosine of a $k^{th}$ canonical angle between the two subspaces after the linear transformation is expressed as $\gamma_k^{(ij)}(T)$. However, in the following description, only a first canonical angle is used as the similarity for simplification, and the attached alphabet "k" is omitted when it is not necessary.

What is essential is to obtain the linear transformation matrix T which increases the similarity $\gamma^{(ij)}(T)$ when the equation $c_i = c_j$ is satisfied, and decreases in other cases, and hence it can be formulated as an expression (5) shown below as a problem of recognition of two classes relating to a combination of the subspaces by using $y_{ij}$ of the expression (5) shown below as a class label.

$$y_{ij} = \begin{cases} 1 & \text{if } c_i = c_j \\ -1 & \text{otherwise} \end{cases} \quad (5)$$

Figure 1:
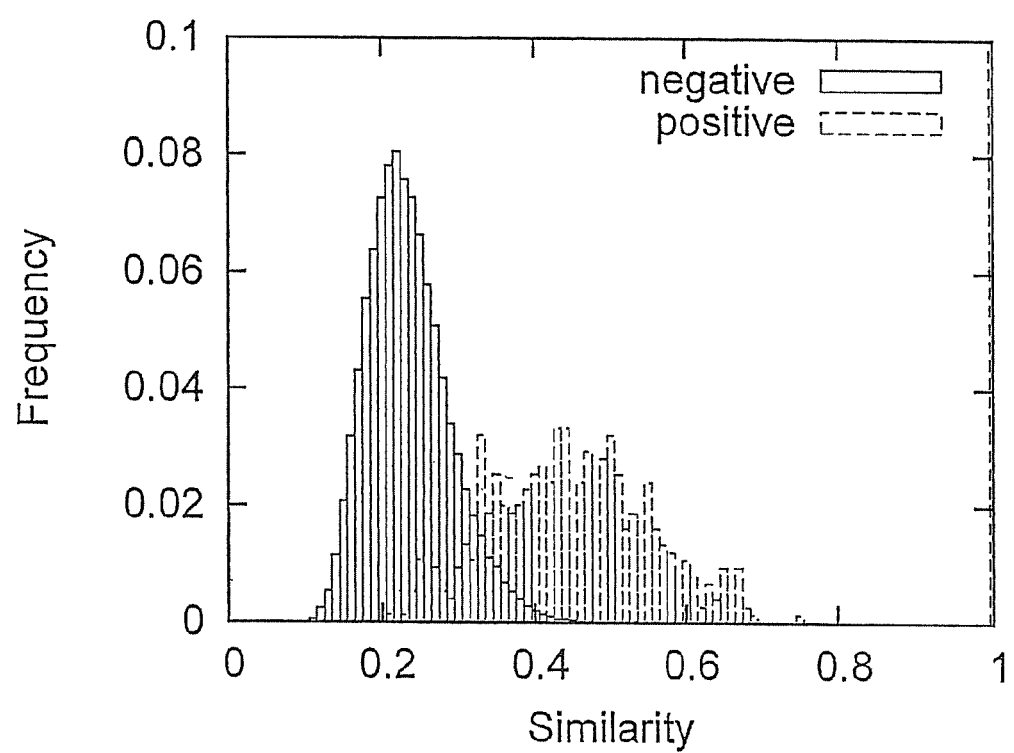
FIG. 1 is a graph showing distributions of similarities in which solid lines indicate the similarities among subspaces which belong to different categories, and broke lines indicate the similarities among subspaces which belong to the same category.

In the case where the linear transformation matrix T is given, when the similarities $\gamma^{(ij)}(T)$ in the spaces after the linear transformation for all of combinations of i and j which satisfy $y_{ij}=1$ and all of combinations of i and j which satisfy $y_{ij}=-1$ respectively in spaces after the linear transformation, distributions as shown in FIG. 1 are obtained. FIG. 1 is a graph showing distributions of the similarity in which solid lines indicate the similarities among the subspaces which belong to different categories, and broken lines indicate the similarities among the subspaces which belong to the same category. A vertical axis represents a frequency of occurences, and a lateral axis represents the similarity.

Here, an object of this embodiment is to obtain the linear transformation matrix T which increases the similarity among the subspaces which belong to the same category and decreases the similarity among the subspaces which belong to the different categories, and hence it is preferable that the two distributions in FIG. 1 are separated clearly as a result of the linear transformation.

Therefore, a loss value for $y_{ij}$, $\gamma^{(ij)}(T)$ is expressed as $l(y_{ij}, \gamma^{(ij)}(T))$, and a sum of the loss values l of all classes or classes selected by a certain standard of i and j is expressed as a loss function $L(T)$ for the linear transformation matrix T. In other words, the loss function $L(T)$ is calculated by summing up the loss values l. Then, the linear transformation matrix T which minimizes the loss function L is obtained. Here, the term "loss function L" means a degree in separation between the distribution of the similarities among the subspaces which belong to the same category and the distribution of the similarity among the subspaces which belong to the different categories, and if the separation is insufficient, the loss is increased correspondingly.

Here, a square of the difference between the similarity and the desired output as in an expression (6) shown below can be used as the loss value l;

$$l(y_{ij}, \gamma^{(ij)}(T)) = \begin{cases} (1 - \gamma^{(ij)}(T))^2 & \text{if } y_{ij} = 1 \\ (\gamma^{(ij)}(T))^2 & \text{otherwise} \end{cases} \quad (6)$$

where the desired output is 1 when $y_{ij}=1$ is satisfied, and 0 when the $y_{ij}=-1$ is satisfied.

As another example, an expression (7) shown below may be used as the loss value l;

$$l(y_{ij}, \gamma^{(ij)}(T)) = -\log p(y=y_{ij}|\gamma^{(ij)}(T)) \quad (7)$$

where $p(y=y_{ij}|\gamma^{(ij)}(T))$ is a posteriori probability of a class label $y_{ij}$ with respect to the similarity $\gamma^{(ij)}(T)$, provided the posteriori probability $p(y=y_{ij}|\gamma^{(ij)}(T))$ is approximated by an expression (8) shown below by a logistic regression on the basis of an empirical distribution of $\gamma^{(ij)}(T)$.

$$p(y = y_{ij} | \gamma^{(ij)}(T)) \approx \frac{1}{1 + \exp\{-y_{ij}(\alpha + \beta\gamma^{(ij)}(T))\}} \quad (8)$$

where $\alpha$ and $\beta$ are parameters obtained by using the logistic regression.

If the loss function $L(T)$ can be differentiated with the linear transformation matrix T, the linear transformation matrix T is optimized iteratively by obtaining a steepest descent direction $-\delta L(T)/\delta T$ of the linear transformation matrix T and updating the linear transformation matrix T with a small step.

Since the loss function L is a function of the similarity $\gamma^{(ij)}(T)$ and $\gamma^{(ij)}(T)$ is a function of the linear transformation matrix T, first of all, it is necessary to obtain differential parameters relating to the linear transformation matrix T of the similarity $\gamma^{(ij)}(T)$.

However, in order to obtain the similarity $\gamma^{(ij)}(T)$, it is necessary to linearly transform the bases $\Phi^{(i)}$, $\Phi^{(j)}$ of the subspaces with the linear transformation matrix T, then convert the bases after the linear transformation to the orthonormal bases, and then solve the eigenvalue problem as the expression (1). However, since the transformation to the orthonormal bases is involved in the course of solving the problem, it is difficult to calculate the differential parameter relating to the linear transformation matrix T in the general form. However, it is possible to calculate the differential parameter only when the linear transformation matrix T is a unit matrix I and, on the basis of this fact, the linear transformation matrix T can be iteratively optimized.

With $T_t$ and $A_t$, which are a linear transformation matrix and an update matrix at time t respectively, the linear transformation matrix T at time t+1 is obtained by $T_{t+1}=T_t A_t$.

When performing the linear transformation with the linear transformation matrix T, the metric matrix M in the space before the liner transformation is $TT^T$, but the metric matrix M in the space after the transformation is $II^T$. Therefore, the updated matrix $A_t$ is obtained by differentiation at T=I, which is easier than differentiation at an arbitrary linear transformation matrix T.

Subsequently, detailed description will be given in sequence.

A canonical angle θ between a k-dimensional subspace $S_a$ and an L-dimensional subspace $S_b$ is obtained, and $i^{th}$ canonical angle is expressed as $\theta_i$, and two unit vectors which forms the canonical angle are expressed as $a_i$ and $b_i$. Assuming that a relation K<L is satisfied, K sets of $\theta_i$, $a_i$, and $b_i$ are obtained.

Here the expression (9) shown below is satisfied as regards $a_i$ and $b_i$.

$$a_i \cdot a_j = \begin{cases} 1 & \text{if } i = j \\ 0 & \text{otherwise} \end{cases} \quad (9)$$

$$b_i \cdot b_j = \begin{cases} 1 & \text{if } i = j \\ 0 & \text{otherwise} \end{cases}$$

$$a_i \cdot b_j = \begin{cases} \cos\theta_i & \text{if } i = j \\ 0 & \text{otherwise} \end{cases}$$

In the metric space defined by the metric matrix $M=TT^T$, a square of a cosine of an angle formed by the vector $a_i$ and a vector $b_j$ is expressed as $\epsilon_{ij}(T)$, $\epsilon_{ij}(T)$ is given by an expression (10) shown below.

$$\epsilon_{ij}(T) = \frac{(a_i^T TT^T b_j)^2}{a_i^T TT^T a_i b_j^T TT^T b_j} \quad (10)$$

By differentiating the expression (10) around T=I and applying the expression (9), an expression (11) shown below is obtained.

$$\left.\frac{\partial \epsilon_{ij}(T)}{\partial T}\right|_{T=I} = \begin{cases} 2\cos\theta_i \begin{Bmatrix} a_i b_j^T + b_j a_i^T - \\ \cos\theta_i(a_i a_i^T + b_j b_j^T) \end{Bmatrix} & \text{if } i = j \\ 0 & \text{otherwise} \end{cases} \quad (11)$$

From the expression (11), when the linear transformation matrix T which defines the metric space is changed slightly from the unit matrix I, the square of the cosine of the angles formed by the vectors which constitutes different canonical angles is kept at zero without change. Therefore, it is understood that the differential of the square of the cosine of the $i^{th}$ canonical angle with respect to the linear transformation matrix T at T=I is equal to the differential of the square of the cosine of the angle formed by the two vectors which form the $i^{th}$ canonical angle. Therefore, the square (=similarity) of the cosine of the canonical angle is given by an expression (12) shown below using the set of vectors which form the canonical angle.

$$\frac{\partial \cos^2 \theta_i}{\partial T}\bigg|_{T=I} = \frac{\partial \varepsilon_{ii}(T)}{\partial T}\bigg|_{T=I} \quad (12)$$
$$= 2\cos\theta_i \{a_i b_i^T + b_i a_i^T - \cos\theta_i (a_i a_i^T + b_i b_i^T)\}$$

Since the differential parameter relating to the linear transformation matrix T of the similarity $\gamma^{(ij)}$ is obtained by using the expression (12), the steepest descent direction of the loss function L(T) is given by an expression (13) shown below.

$$-\frac{\partial L(T)}{\partial T}\bigg|_{T=I} = -\sum_i \sum_j \frac{\partial L(T)}{\partial \gamma^{(ij)}} \frac{\partial \gamma^{(ij)}}{\partial T}\bigg|_{T=I} \quad (13)$$

By summarizing the description given thus far, the method of optimizing the linear transformation matrix T is as follows.

First of all, an initial value of the linear transformation matrix $T_1$ is set to $T_1=I$.

Secondary, the basis of the subspace is linearly transformed with the linear transformation matrix $T_t$, and the bases after the linear transformation are converted to orthonormal ones.

Thirdly, the loss function $L(T_t)$ is obtained.

Fourthly, the metric matrix in the space after the linear transformation is expressed as $M_t=TT^T$, and the loss function $L(T_t)$ is differentiated around T=I, and a matrix of the differential parameters are expressed as $G_t$. In other words, the result of the expression (13) is expressed as $G_t$.

Fifthly, the linear transformation matrix $T_t$ is updated as $T_{t+1}=T_t(I+\delta_t G_t)$ using the small positive scalar $\delta_t$.

Sixthly, the second to fifth procedures are repeated to continue updating until convergence conditions are satisfied. Here, t designates the number of iterations and a relation t>1 is satisfied.

With this procedure, the linear transformation matrix T which increases the canonical angles among the subspaces which belong to the different subspaces, while decreases the canonical angles among the subspaces which belong to the same category is obtained.

First Embodiment

Referring now to the drawings, a first embodiment of the invention will be described.

Figure 2:
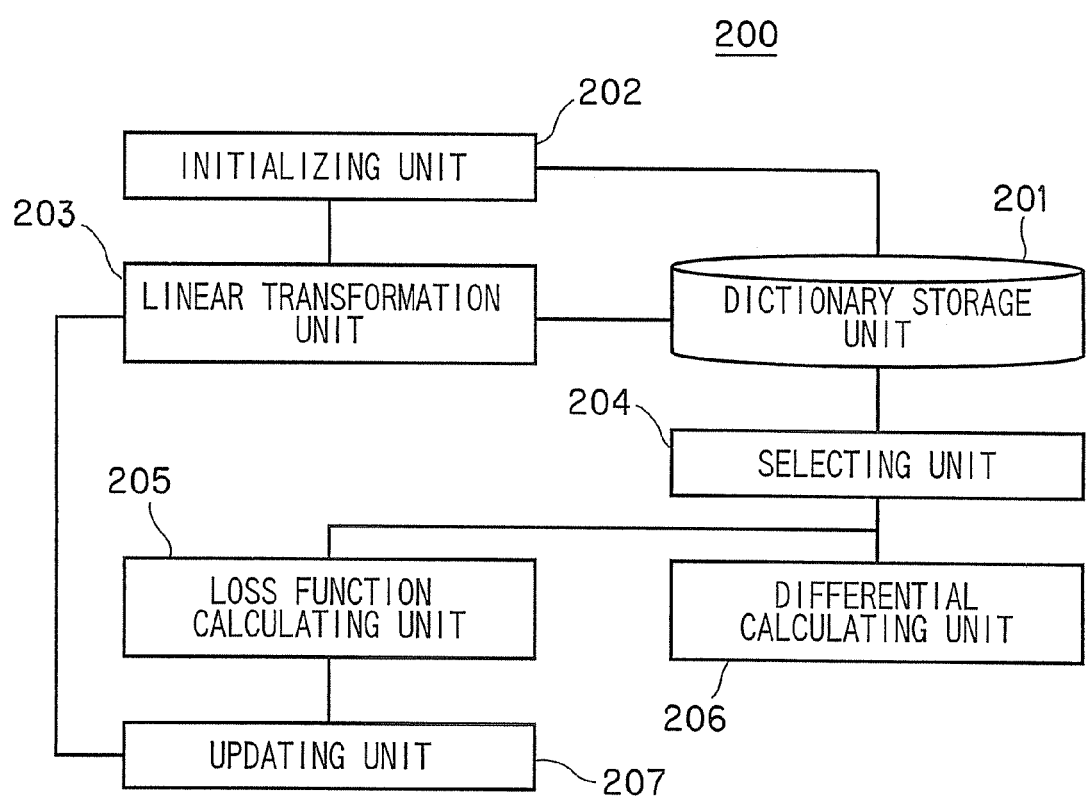
FIG. 2 is a block diagram of a linear transformation matrix calculating apparatus according to a first embodiment.
Figure 3:
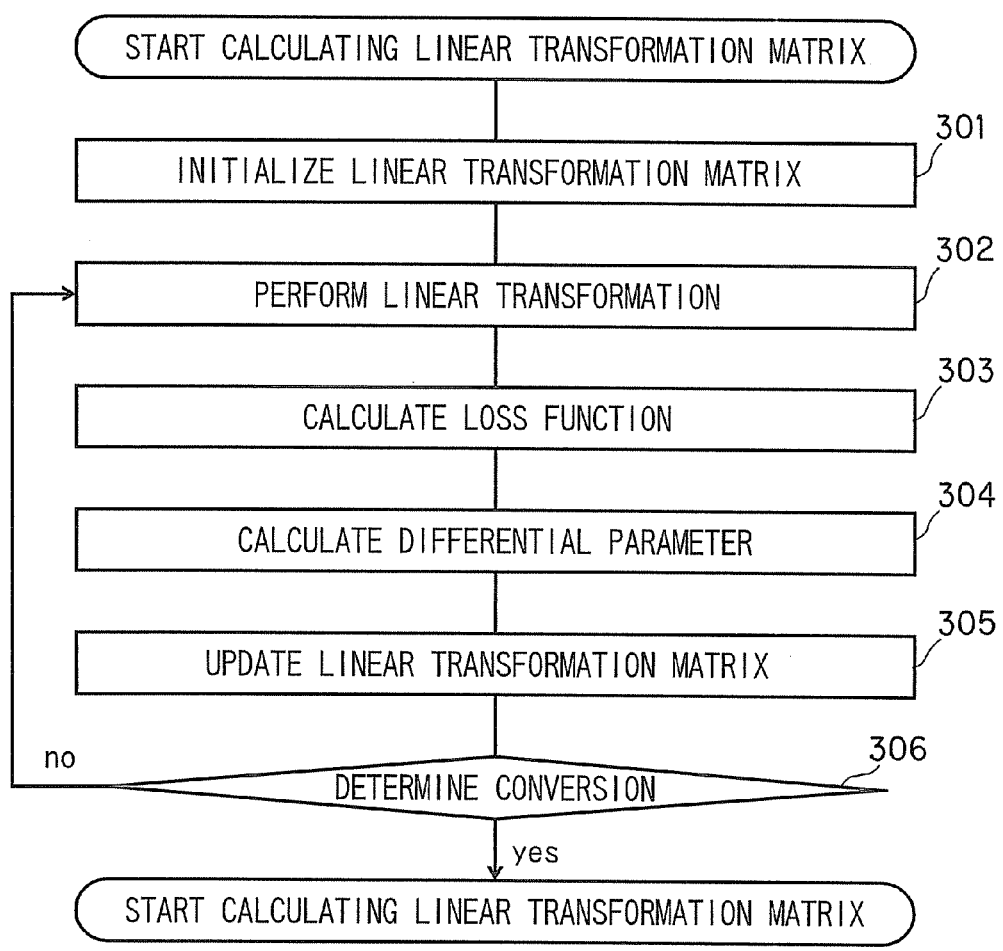
FIG. 3 is a flowchart of the linear transformation matrix calculating apparatus.

Referring to FIG. 2 and FIG. 3, a linear transformation matrix calculating apparatus (hereinafter, referred to simply as "matrix calculating apparatus") 200 according to the first embodiment of the present invention will be described.

A configuration of the matrix calculating apparatus 200 according to the first embodiment will be described with reference to FIG. 2. FIG. 2 is a block diagram of the matrix calculating apparatus 200 according to the first embodiment.

The matrix calculating apparatus 200 includes a dictionary storage unit 201, an initializing unit 202, a linear transformation unit 203, a selecting unit 204, a loss function calculating unit 205, a differential calculating unit 206, and an updating unit 207.

The matrix calculating apparatus 200 is also realized by using a general-purpose computer as basic hardware. In other words, the initializing unit 202, the linear transformation unit 203, the selecting unit 204, the loss function calculating unit 205, the differential calculating unit 206, and the updating unit 207 are realized by causing a processor mounted on the above-described computer to execute the program. At this time, the matrix calculating apparatus 200 may be realized by installing the above-described program in the computer apparatus in advance, or may be realized by storing the same in a storage medium such as a CD-ROM or by distributing the above-described program via a network and installing the program in the computer as needed.

The dictionary storage unit 201 stores the orthonormal bases of a plurality of the dictionary subspaces per category and the subspaces after having applied the linear transformation on these dictionary subspaces. These dictionary subspaces correspond to the subspaces in the theory of the embodiments described above. A configuration in which the dictionary storage unit 201 is not provided and the orthonormal bases of the plurality of dictionary subspaces per category and the subspaces after having applied with the linear transformation on these dictionary subspaces are retrieved from the outside is also applicable.

The term "category" here means a range to which the same patterns belong when performing the pattern recognition and, for example, persons, faces of persons, bodies of persons, genders, ages, substances, colors, patterns correspond to respective categories.

The initializing unit 202 provides the initial value of the linear transformation matrix T. The initial value may be the unit matrix I and may be the linear transformation matrix T obtained by using the Orthogonal Mutual Subspace Method. It is also possible not to provide the initializing unit 202 and provide the initial value by the linear transformation unit 203, described later.

The linear transformation unit 203 holds the linear transformation matrix T, applies the linear transformation on all of the dictionary subspaces, obtains the orthonormal bases of the subspaces after the linear transformation, and stores the same in the dictionary storage unit 201.

The selecting unit 204 selects a plurality of dictionary subspaces from the remaining dictionary subspaces for one input dictionary subspace.

As a first selecting method, the selecting unit 204 selects a set of two dictionary subspaces for all of the dictionary subspaces. However, for example, when it is supposed that there are 10000 dictionary subspaces in total, losses and differentials for the remaining 9999 dictionary subspaces per one dictionary subspace are to be calculated, so that the quantity of calculation is very large. In addition, since the canonical angles among the dictionary subspaces which belong to the different categories are large in many cases, the calculation for optimization does not have to be performed for all of the combinations from a practical standpoint.

Therefore, as a second selecting method, the selecting unit 204 selects a set of two dictionary subspaces as follows. First, similarities of all the pairs of subspaces which belong to the different categories are calculated and a predetermined number of pairs of subspaces are selected based on descending order of similarity. Second, similarities of all the pairs of subspaces which belong to the same categories are calculated and a predetermined number of pairs of subspaces are selected based on ascending order of similarity. In the calculation of the similarity $\gamma$, a first eigenvalue obtained by solving the eigenvalue problem in the expression (2), or a sum from the first eigenvalue to the $h^{th}$ eigenvalue is used.

The linear transformation matrix T is inputted to the loss function calculating unit 205, and calculates the loss values l with respect to the dictionary subspaces selected by the selecting unit 204 for the respective dictionary subspaces on the basis of the expression (6) or the expression (7), and the loss function L which is a sum of all of the loss values l is obtained. At this time, the similarities γ of the dictionary subspaces applied with the linear transformation by the linear transformation unit 203 are used for the calculation of the loss values l.

The differential calculating unit 206 calculates differential parameters of the loss functions L with respect to the dictionary subspaces selected by the selecting unit 204 on the basis of the expression (13) for all of the dictionary subspaces. At this time, the similarities (of the dictionary subspaces applied with the linear transformation by the linear transformation unit 203 are used for the calculation of the differential parameters. The obtained result of the expression (13) is expressed as a matrix G of the differential parameters. The two dictionary subspaces used in this differential calculating unit 206 may be the same as the two dictionary subspaces used in the loss function calculating unit 205, or may be different dictionary subspaces.

The updating unit 207 calculates T (I+δG) as a new linear transformation matrix from the linear transformation matrix T using the matrix G of the differential parameters obtained by the differential calculating unit 206 and a minute constant updated width δ until certain convergence conditions such that the number of times of update t reaches a specific number or a decrement of the loss function L during the specified number of times of update is not larger than a threshold value. Then, the updating unit 207 updates so that linear transformation unit 203 performs the linear transformation on the dictionary subspaces using the new linear transformation matrix T (I+δG).

An operation of the matrix calculating apparatus 200 will be described with reference to FIG. 3. FIG. 3 is a flowchart of the matrix calculating apparatus 200.

In Step 301, the initializing unit 202 generates the initial value of the linear transformation matrix T.

In Step 302, the linear transformation unit 203 performs the linear transformation for all of the dictionary subspaces stored in the dictionary storage unit 201 using the linear transformation matrix T. The linear transformation unit 203 transforms the bases of the subspaces after the linear transformation into the orthonormal system and stores the same in the dictionary storage unit 201.

In Step 303, the selecting unit 204 selects the sets of two dictionary subspaces for all of the dictionary subspaces after the linear transformation stored in the dictionary storage unit 201. The loss function calculating unit 205 obtains the loss function L for the similarities γ of all of the selected sets of the dictionary subspaces.

In Step 304, the selecting unit 204 selects the sets of two dictionary subspaces for all of the dictionary subspaces after the linear transformation stored in the dictionary storage unit 201. The differential calculating unit 206 obtains the matrix G of the differential parameter for the similarities γ of all of the selected sets of the dictionary subspaces.

In Step 305, the updating unit 207 determines conversion from the loss function L calculated in Step S303 and the number of times of update t (if no), and if it is not converged, the procedures from the linear transformation Step 302 onward are repeated and if it is determined to be converged, the procedure is ended (if yes).

According to the first embodiment, the canonical angles among the dictionary subspaces which belong to the different subspaces are increased. In contrast, the linear transformation matrix T which decreases the canonical angles among the dictionary subspaces which belong to the same category may be obtained.

Second Embodiment

Figure 4:
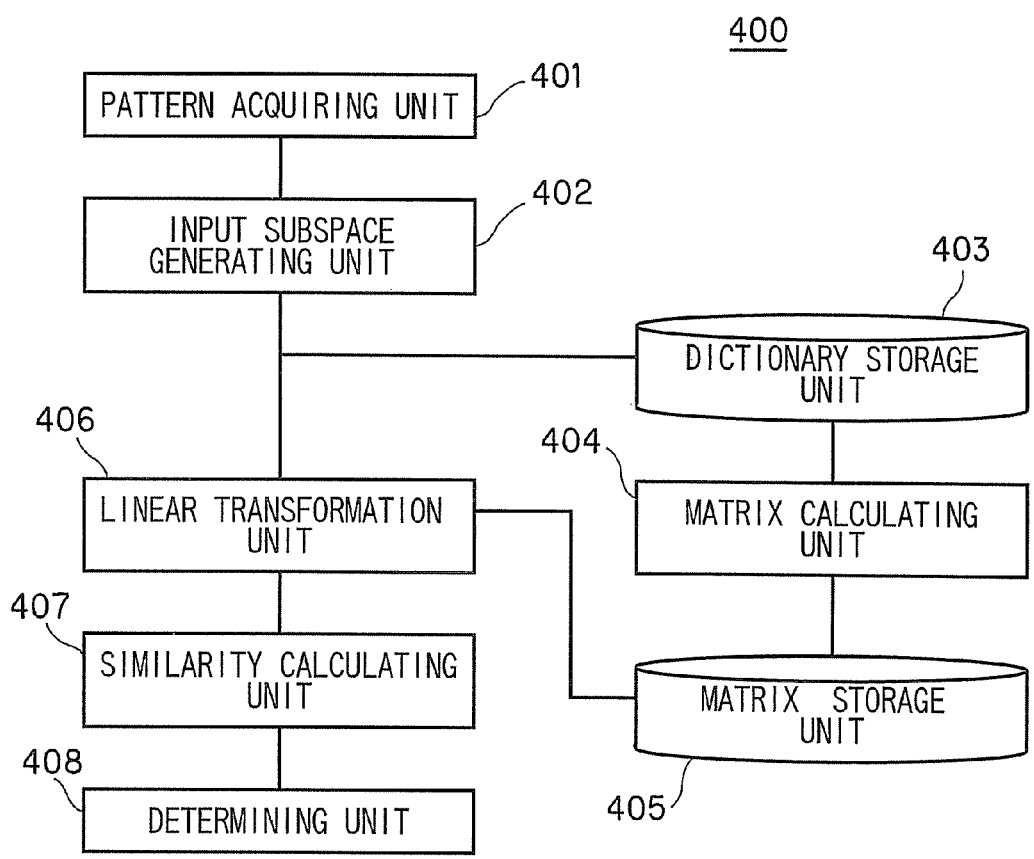
FIG. 4 is a block diagram of a pattern recognizer according to a second embodiment.
Figure 5:
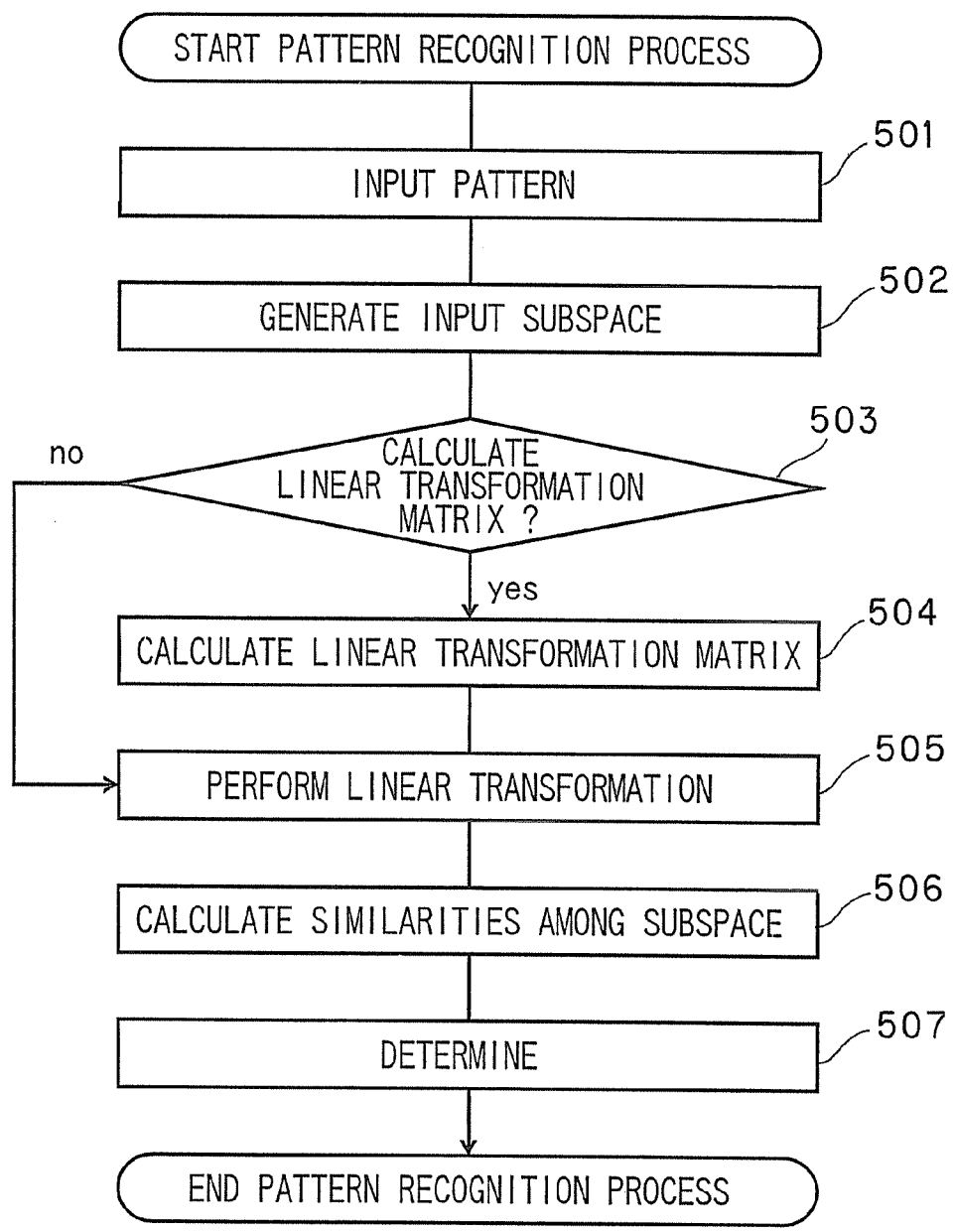
FIG. 5 is a flowchart of the pattern recognizer.

Referring to FIG. 4 to FIG. 5, a pattern recognizer 400 according to a second embodiment of the invention will be described.

The pattern recognizer 400 in the second embodiment is configured to perform the pattern recognition using the linear transformation matrix T calculated by the matrix calculating apparatus 200 shown in the first embodiment.

The configuration of the pattern recognizer 400 will be described with reference to FIG. 4. FIG. 4 is a block diagram of the pattern recognizer 400.

The pattern recognizer 400 includes a pattern acquiring unit 401, an input subspace generating unit 402, a dictionary storage unit 403, a matrix calculating unit 404, a matrix storage unit 405, a linear transformation unit 406, a similarity calculating unit 407, and a determining unit 408.

The pattern acquiring unit 401 acquires the patterns of the target of recognition by the number of times specified in advance by a camera or the like.

The input subspace generating unit 402 obtains the input subspace by performing principal component analysis for the plurality of input patterns acquired by the pattern acquiring unit 401.

The dictionary storage unit 403 stores one or a plurality of dictionary subspaces on the category-to-category basis registered in advance. The dictionary storage unit 403 corresponds to the dictionary storage unit 201 in the first embodiment.

The matrix calculating unit 404 includes the matrix calculating apparatus 200 shown in the first embodiment, and the matrix calculating apparatus 200 calculates the linear transformation matrix T for the dictionary subspaces stored in the dictionary storage unit 403. The calculation of the linear transformation matrix T does not have to be performed every time and may be performed only when the number of registered categories or the number of the dictionary subspaces is changed.

The matrix storage unit 405 stores the linear transformation matrix T calculated by the matrix calculating unit 404.

The linear transformation unit 406 performs the linear transformation of the input subspaces and the dictionary subspaces respectively using the linear transformation matrix T stored in the matrix storage unit 405. More specifically, the basis vectors of the subspaces are transformed by the linear transformation matrix, and the basis vectors after the transformation is converted into the orthonormal bases by the Gram-Schmidt orthogonalization.

The similarity calculating unit 407 calculates the similarities between the linearly transformed dictionary subspaces and the linearly transformed input subspaces by using the Mutual Subspace Method. More specifically, the first eigenvalue of the eigenvalue problem of the expression (2) or the sum from the first eigenvalue to the $h^{th}$ eigenvalue are determined as the similarity between the two subspaces, where the orthonormal bases of the dictionary subspace after the linear transformation is expressed as $\Phi^{(n)}$, and the orthonormal basis of the input subspace after the linear transformation is expressed as $\Phi^{(m)}$, provided that h>1.

If the value of the similarity calculated by the similarity calculating unit 407 is the largest and this value is larger than the preset threshold value, the determining unit 408 outputs the category corresponding to the dictionary subspace where the corresponding similarity is calculated as the result of recognition. In other cases, the determining unit 408 outputs the result of determination such that there is no matching with the registered categories.

The operation of the pattern recognizer 400 will be described with reference to FIG. 5. FIG. 5 is a flowchart of the pattern recognizer 400.

In Step 501, the pattern acquiring unit 401 acquires the pattern of the target of recognition such as an image or a speech by the number of times specified in advance.

In Step 502, the input subspace generating unit 402 obtains the input subspace by performing the analysis of principal component for a plurality of the input patterns.

In Steps 503 and 504, the matrix calculating unit 404 calculates the linear transformation matrix T by the matrix calculating apparatus 200 shown in the first embodiment. The matrix storage unit 405 stores the calculated linear transformation matrix T.

In Step 505, the linear transformation unit 406 performs the linear transformation of the input subspaces and the dictionary subspaces respectively using the linear transformation matrix T stored in the matrix storage unit 405.

In Step 506, the similarity calculating unit 407 calculates the similarities between the linearly transformed dictionary subspaces and the linearly transformed input subspaces by using the Mutual Subspace Method.

In Step 507, if the value of the similarity calculated by the similarity calculating unit 407 is the largest and this value is larger than the preset threshold value, the determining unit 408 outputs the category corresponding to the dictionary subspace where the corresponding similarity is calculated as the result of recognition. In other cases, the determining unit 408 outputs the result of determination such that there is no matching with the registered categories.

According to the second embodiment, a highly accurate pattern recognition is achieved by performing the pattern recognition by linearly transforming the input subspaces and the dictionary subspaces respectively using the linear transformation matrix T obtained by the matrix calculating apparatus 200 shown in the first embodiment.

The invention is not limited to the embodiments described above, and may be modified variously without departing the scope of the invention.

What is claimed is:

1. A linear transformation matrix calculating apparatus configured to obtain a linear transformation matrix used by a pattern recognizer for linearly transforming an input subspace and dictionary subspaces as a preprocessing for a calculation of similarities by using Mutual Subspace Method, the pattern recognizer being configured to obtain the input subspace from an input pattern, calculate the similarities between the input subspace and a plurality of the dictionary subspaces which belong to respective categories specified in advance by using the Mutual Subspace Method, and classify the input pattern into one of the categories on the basis of the similarities, comprising:
a linear transformation unit configured to linearly transform the plurality of dictionary subspaces which belong to the respective categories respectively by the linear transformation matrix;
a loss function calculating unit configured to calculate loss functions using the similarities among the plurality of linearly transformed dictionary subspaces;
a differential calculating unit configured to calculate a differential parameter obtained by differentiation of the loss function with respect to the linear transformation matrix; and
an updating unit configured to calculate a new linear transformation matrix by the differential parameter and the linear transformation matrix by Steepest Descent Method and update the new linear transformation matrix as the linear transformation matrix used in the linear transformation unit.

2. The apparatus according to claim 1, wherein the loss function calculating unit respectively calculates loss values using the similarities between the two dictionary subspaces in the each set, and
calculates the loss function by summing all of the loss values of the plurality of sets of the dictionary subspaces.

3. The apparatus according to claim 1, wherein the differential calculating unit obtains the differential parameter by expressing a metric matrix in the space after the linear transformation by the linear transformation matrix T as $M_t=TT^T$, and differentiating the loss function around the linear transformation matrix T=the unit matrix I.

4. The apparatus according to claim 1, wherein the linear transformation unit uses a linear transformation matrix obtained by using a unit matrix or Orthogonal Mutual Subspace Method as an initial value of the linear transformation matrix.

5. A pattern recognizer configured to classify an input pattern into respective categories specified in advance by using Mutual Subspace Method comprising:
an input subspace calculating unit configured to calculate an input subspace from the input pattern;
a dictionary subspace calculating unit configured to calculate dictionary subspaces which belong to the respective categories;
a linear transformation unit configured to linearly transform the input subspace and the dictionary subspaces respectively using a linear transformation matrix calculated by the linear transformation matrix calculating apparatus according to claim 1;
a similarity calculating unit configured to calculate a similarity between the linearly transformed input subspace and the linearly transformed dictionary subspaces; and
a determining unit configured to determine the category that the input pattern corresponding to the input subspace belongs using the similarity.

6. A linear transformation matrix calculating method for obtaining a linear transformation matrix used in a pattern recognizing method for linearly transforming an input subspace and dictionary subspaces as a process in preparation for a calculation of similarities by using the Mutual Subspace Method, the pattern recognizing method including transforming an input pattern into the input subspace; calculating the similarities between the input subspace and a plurality of dictionary subspaces which belong to respective categories specified in advance, and classifying the input pattern into one of the categories by using the Mutual Subspace Method, comprising:
linearly transforming the plurality of dictionary subspaces which belong to the respective categories using the linear transformation matrix respectively at a linearly transformation unit;
selecting a plurality of sets of the two dictionary subspaces from the plurality of linearly transformed dictionary subspaces and calculating a loss function using the respective similarities among the selected sets of the dictionary subspaces at a loss function calculating unit;

calculating a differential parameter obtained by differentiating the loss function with respect to the linear transformation matrix at a differential calculating unit; and calculating a new linear transformation matrix using the differential parameter and the linear transformation matrix by Steepest Descent Method and updating the new linear transformation matrix as the linear transformation matrix used in the linearly transforming at an updating unit.

7. A pattern recognition method for classifying an input pattern into respective categories specified in advance by using Mutual Subspace Method comprising:

calculating an input subspace from the input pattern;

calculating dictionary subspaces which belong to the respective categories;

linearly transforming the input subspace and the dictionary subspaces respectively using a linear transformation matrix calculated by the linear transformation matrix calculating method according to claim 6;

calculating a similarity between the linearly transformed input subspace and the linearly transformed dictionary subspaces; and determining the category that the input pattern corresponding to the input subspace belongs using the similarity.

8. A linear transformation matrix calculating program stored in a non-transitory computer readable storage medium, for obtaining a linear transformation matrix used in a pattern recognition program for linearly transforming an input subspace and dictionary subspaces as a process in preparation for a calculation of similarities by using the Mutual Subspace Method, the pattern recognizing program including the instruction of transforming an input pattern into the input subspace, calculating the similarities between the input subspace and a plurality of the dictionary subspaces which belong to respective categories specified in advance, and classifying the input pattern into one of the categories by using the Mutual Subspace Method, the linear transformation matrix calculating program causes the computer to execute the instruction of:

linearly transforming the plurality of dictionary subspaces which belong to the respective categories using the linear transformation matrix respectively;

selecting a plurality of sets of the two dictionary subspaces from the plurality of linearly transformed dictionary subspaces and calculating a loss function using the respective similarities among the selected sets of the dictionary subspaces;

calculating a differential parameter obtained by differentiating the loss function with respect to the linear transformation matrix; and calculating a new linear transformation matrix using the differential parameter and the linear transformation matrix by Steepest Descent Method and updating the new linear transformation matrix as the linear transformation matrix used in the instruction of linearly transforming.

9. A pattern recognition program stored in a non-transitory computer readable storage medium for classifying an input pattern into respective categories specified in advance by using Mutual Subspace Method, which causes the computer to realize the instructions of:

calculating an input subspace from the input pattern;

calculating dictionary subspaces which belong to the respective categories;

linearly transforming the input subspace and the dictionary subspaces respectively using a linear transformation matrix calculated by the linear transformation matrix calculating program according to claim 8;

calculating a similarity between the linearly transformed input subspace and the linearly transformed dictionary subspaces; and determining the category that the input pattern corresponding to the input subspace belongs using the similarity.

* * * * *